United States Patent
Chan (10) Patent No.: US 10,328,973 B2
(45) Date of Patent: Jun. 25, 2019

(54) ASSISTING DRIVERS WITH ROADWAY LANE CHANGES

(71) Applicant: Ford Global Technologies, LLC, Dearborn, MI (US)

(72) Inventor: Lindsay Chan, Oakland, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 78 days.

(21) Appl. No.: 15/450,436

(22) Filed: Mar. 6, 2017

(65) Prior Publication Data
US 2018/0251155 A1    Sep. 6, 2018

(51) Int. Cl.
| B60R 1/00 | (2006.01) |
| G08G 1/01 | (2006.01) |
| G08G 1/16 | (2006.01) |
| B62D 15/02 | (2006.01) |
| G08G 1/052 | (2006.01) |

(52) U.S. Cl.
CPC .............. *B62D 15/029* (2013.01); *B60R 1/00* (2013.01); *B62D 15/0255* (2013.01); *G08G 1/0112* (2013.01); *G08G 1/0125* (2013.01); *G08G 1/052* (2013.01); *G08G 1/163* (2013.01); *G08G 1/167* (2013.01); *B60R 2300/205* (2013.01)

(58) Field of Classification Search
CPC .............. B62D 15/029; B62D 15/0255; G08G 1/0125; G08G 1/052; G08G 1/0112; G08G 1/163; G08G 1/167; B60R 1/00; B60R 2300/205
See application file for complete search history.

(56) References Cited

U.S. PATENT DOCUMENTS

| 9,092,987 B2 | 7/2015 | Bone |
| 2003/0163239 A1 | 8/2003 | Winner et al. |
| 2013/0194110 A1 | 8/2013 | Kim et al. |
| 2015/0154802 A1 | 6/2015 | Song |
| 2015/0194055 A1* | 7/2015 | Maass ............. B60W 50/14 340/905 |
| 2015/0204687 A1 | 7/2015 | Yoon |
| 2015/0321699 A1 | 11/2015 | Rebhan |

(Continued)

FOREIGN PATENT DOCUMENTS

| DE | 102013005404 | 9/2013 |
| GB | 2556652 | 6/2018 |

(Continued)

*Primary Examiner* — Russell Frejd
(74) *Attorney, Agent, or Firm* — David R. Stevens; Stevens Law Group (57) ABSTRACT

The present invention extends to methods, systems, and computer program products for assisting drivers with roadway lane changes. In general, aspects of the invention are used in motorized vehicles to guide a driver to a more efficiently operating lane of a multi-lane roadway. A lane recommendation can be based on sensed and/or communicated aspects of surrounding vehicles (e.g., speed, acceleration, etc.). Lane recommendations can be communicated to a driver with audio and/or visual cues. In one aspect, images of surrounding roadway are augmented with additional data to highlight lanes, lane change locations, other vehicles, etc. Lane recommendations can be revised in (essentially) real-time in response to changing conditions in a roadway environment (e.g., a vehicle in a neighboring lane has changed speed).

20 Claims, 6 Drawing Sheets

(56) References Cited

U.S. PATENT DOCUMENTS

2015/0344033 A1 12/2015 Fukuda et al.
2017/0124882 A1* 5/2017 Wang ..................... G08G 1/167

FOREIGN PATENT DOCUMENTS

| WO | WO-2015134421 A1 | 9/2015 |
| WO | WO 2015/177157 | 11/2015 |
| WO | WO-2015190212 A1 | 12/2015 |
| WO | WO 2016/027432 | 2/2016 |
| WO | WO 2017/022198 | 2/2017 |
| WO | WO 2017/162278 | 9/2017 |

* cited by examiner

ASSISTING DRIVERS WITH ROADWAY LANE CHANGES

CROSS-REFERENCE TO RELATED APPLICATIONS

Not applicable.

1. Field of the Invention

This invention relates generally to operating motor vehicles, and, more particularly, to assisting drivers with roadway lane changes.

2. Related Art

Much of the cognitive overhead of operating a motor vehicle involves lane changing. A driver unfamiliar with a particular route may, in an effort to avoid missing a turn or highway off ramp, resort to making one or several quick lane changes. Quick lane changes are often unsafe for both the driver and for nearby vehicles. When making a lane change, at least two fundamental questions can be considered: (a) "What lane should I be in?" and (b) "When should I change lanes?". Due to the cognitive overhead associated with lane changes, some vehicles include navigation and route planning technologies. Navigation and route planning technologies assist a driver to reduce cognitive overhead on the driver.

These technologies fall into essential two categories: offline lane suggestion systems and warning systems. Offline lane suggestion systems can suggest a lane for a vehicle to move into. However, offline lane suggestion systems are typically unaware of which lane a vehicle is currently in and are not responsive to the local environment (e.g., do not account for actual lane usage). Additionally, suggestions are terminal conditions and do not provide a feasible plan for guiding the driver to the suggested lane. Warning systems can perform instantaneous blind spot detection to avert unsafe lane transitions. However, warning systems typically lack functionality for forward plans and are incapable of scheduling lane changes into the future.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for assisting drivers with roadway lane changes. In general, aspects of the invention are used in motorized vehicles to guide a driver to a more efficiently operating lane of a multi-lane roadway. A lane recommendation can be based on sensed and/or communicated aspects of surrounding vehicles. Lane recommendations can be communicated to a driver with audio and/or visual cues. Lane recommendations can be revised in (essentially) real-time in response to changing conditions in a roadway environment (e.g., a vehicle in a neighboring lane has changed speed).

In heavier traffic conditions, it may be difficult to maneuver around other vehicles to travel a more optimal route to a destination. Drivers are often unable to make their way around other vehicles in the safest and most reliable manner due to lack of visibility extending beyond their peripheral line of sight. Shifting lanes, and even merging, can become complicated as the number of vehicles on the road increases. Drivers can get caught in between other cars unable to gauge the speeds of the vehicles around them.

Aspects of the invention can be used to assist a driver with selecting and transitioning into an optimal lane based on localized traffic conditions. Aspects of the invention are useful when some lanes of traffic are moving faster, for example, due to less merging or free exits, or where lanes may be blocked due to slower moving vehicles. Components of a lane change assist system can be embedded within a vehicle to alleviate many obstacles during a commute to create a safe and more efficient environment on highways and freeways.

A lane change assist system in a vehicle can include a lane recommendation system. A lane recommendation system can use the speed and acceleration or a vehicle and the speed and acceleration of other nearby vehicles to make a lane recommendation. In one aspect, the vehicle uses LIDAR to determine the current speed and acceleration of surrounding vehicles and the acceleration of the vehicle. From the acceleration of the vehicle, future speeds of the vehicle (e.g., a few seconds later) can be derived.

The vehicle can also use various sensors to determine a current lane where the vehicle is currently traveling. The vehicle can also use vehicle-to-vehicle (V2V) communication to both send and receive data from surrounding vehicles within a specified distance of the vehicle. For example, using V2V various vehicles within a specified distance of one another can exchange speed and acceleration (or deceleration) information.

In one aspect, a vehicle includes an Augmented Reality (AR) projection system, such as, for example, a system that projects a display (e.g., a Heads Up Display (HUD)) on the front windshield of the vehicle. Using Augmented Reality (AR), a projection system can highlight (e.g., from ambient light, coating, sparling road, etc.) one or more recommended lanes to the driver based on the average projected speed of surrounding vehicles. Using AR, the projection system can also indicate the average projected speed of the surrounding vehicles within the one or more recommended lanes. Recommended lanes may be lanes where traffic is moving faster than the current lane. Recommended lanes may be adjacent lanes to the left or right of the current lane or may be other lanes that are further from the current lane, for example, two or more lanes to the left or two or more lanes to the right of the current lane.

A processing unit (e.g., CPU) in the vehicle can store, calculate, and analyze data to determine and suggest an appropriate lane for the vehicle to occupy. In one aspect, an appropriate lane can be determined based on a fastest-projected-speed of all the possible lanes. Calculations can be made based on speed and acceleration of surrounding vehicles. Calculations can include determining if switching to another lane is an optimal choice for the vehicle in the near term and/or if the vehicle has appropriate speed and/or acceleration to bypass other vehicles in surrounding lanes to make a lane change.

A lane change assist system can also include a location determination module. When a recommended lane is suggested (e.g., through highlighting in the AR), a driver may choose to initiate a lane change to the recommended lane. In one aspect, a driver indicates a desire to change lanes by activating a turn signal in the direction of the recommended lane. Activation of the turn signal indicates to the lane change assist system that a lane change to the recommended lane is desired. In response to turn signal activation, one or more vehicles in the recommended lane are highlighted in the AR. Vehicle highlighting can include one or of: ambient AR light, coating, sparkling model, etc. A number can be displayed relative to each of the one or more vehicles indicating an appropriate speed the vehicle is to maintain in order to safely merge into the recommended lane.

If a turn signal is not activated (e.g., within a specified time), the lane change assist system determines that the driver has ignored the suggested lane change and no further action is taken.

The processing unit (e.g., CPU) in the vehicle can calculate a safe speed needed to change lanes in addition to being able to analyze the data of surrounding cars to identify a single vehicle to allow for such movement. On the other hand, if a driver attempts to merge or change lanes unsafely on his or her own, the lane change assist system can warn the driver that the desired lane is unsafe, notify the user to slow down, notify the driver not change lanes at a given time, etc.

Aspects of the invention increase safety by providing additional sensing capabilities to assist a driver and enhancing a driver experience during travel. Efficiency and safety in travel is improved providing a benefit to the mobility of drivers on a roadway.

Figure 1:
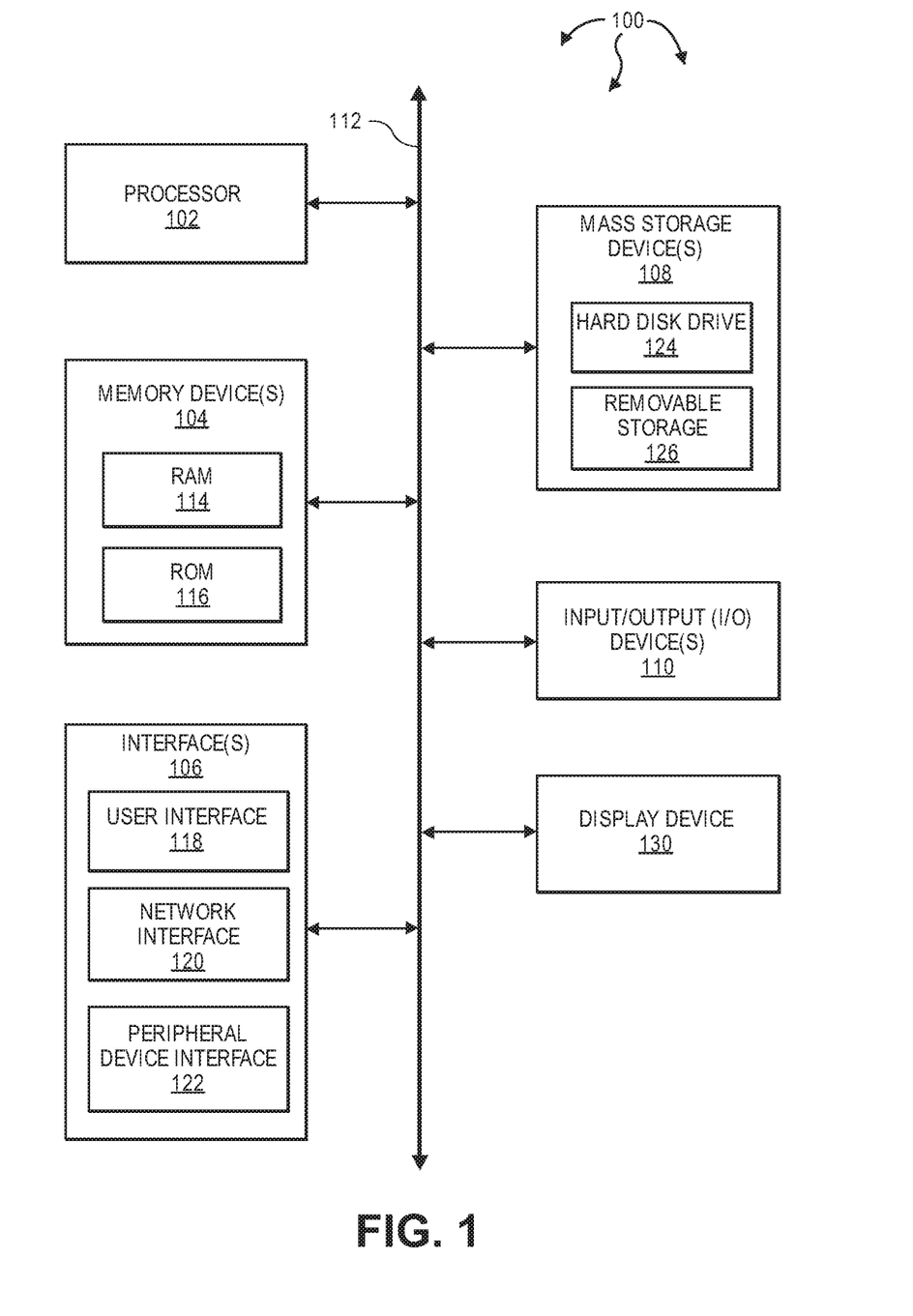
FIG. 1 illustrates an example block diagram of a computing device.

Aspects of the invention can be implemented in a variety of different types of computing devices. FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), controller area networks (CANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In this description and the following claims, "augmented reality" ("AR") is defined as a live direct or indirect view of a physical, real-world environment whose elements are augmented (or supplemented) by computer-generated sensory input such as sound, video, graphics, Global Positioning System (GPS) data. Augmentation can be in real time and in semantic context with environmental elements, such as highlighting lanes or vehicles or indicating speeds along with vehicles in a roadway environment. That is, information about an environment and its objects is overlaid on the real world.

Figure 2:
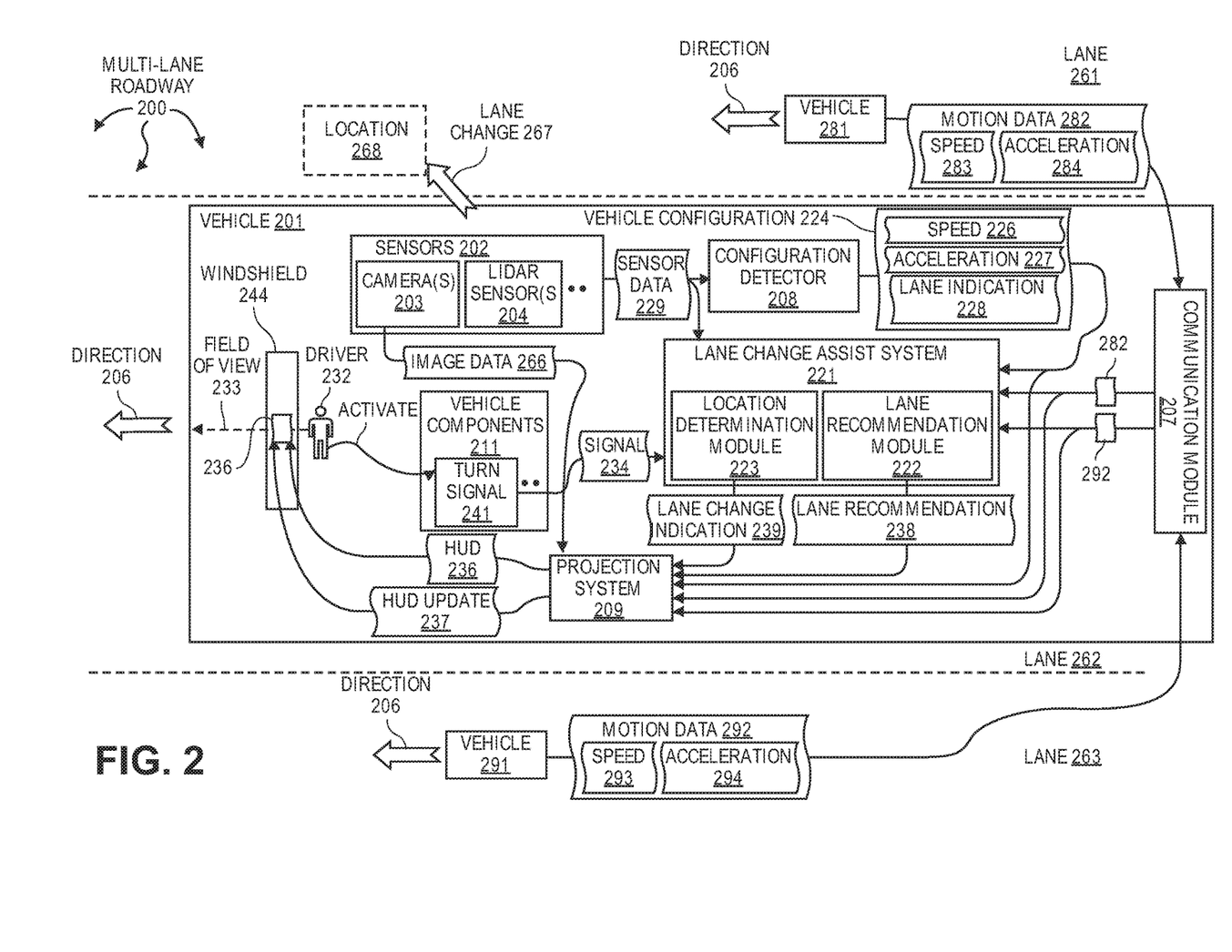
FIG. 2 illustrates an example multi-lane roadway where drivers can be assisted with roadway lane changes.

FIG. 2 illustrates an example multi-lane roadway 200 where drivers can be assisted with roadway lane changes. Referring to FIG. 2, multi-lane roadway 200 includes lanes 261, 262, and 263 designated to carry motor vehicle traffic in direction 206. Vehicles 201, 281, and 291 are traveling in lanes 262, 261, and 263 respectively and traveling in direction 206. Each of vehicles 201, 281, and 291 can vary in size and can be the same type of vehicle or a different type of vehicle, such as, for example, a car, a truck, a bus, a van, a motorcycle, etc. In one aspect, lanes 261 and 263 are adjacent to lane 262. For example, lane 261 can be the next lane to the right of lane 262 (when moving in direction 206). Lane 263 can be the next lane to the left of lane 262 (when moving in direction 206).

Multi-lane roadway 200 may include one or more additional lanes (not shown) also designated to carry traffic in direction 206. For example, multi-lane roadway 200 may include one or more additional lanes to the right of lane 261 and/or one or more additional lanes to the left of lane 263 also designated to carry traffic in direction 206. Multi-lane roadway 200 may also include a plurality of lanes (not shown) designated to carry traffic in opposition to direction 206. A divider may separate lanes designated to carry traffic in direction 206 from lanes designated to carry traffic in opposition to direction 206 (e.g., a divided highway or freeway).

As depicted, vehicle 201 includes sensors 202, communication module 207, configuration detector 208, projection system 209, vehicle components 211, lane change assist system 221, and windshield 244. Each of sensors 202, communication module 207, configuration detector 208, projection system 209, vehicle components 211, lane change assist system 221, and windshield 244 as well as their respective components can be connected to one another over (or be part of) a network, such as, for example, a PAN, a LAN, a CAN, a WAN, and even the Internet. Accordingly, sensors 202, communication module 207, configuration detector 208, projection system 209, vehicle components 211, lane change assist system 221, and windshield 244 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Driver 232 can use vehicle components 211 to control the operation of vehicle 201. For example, driver 232 can use turn signal 241 to alert other vehicles when vehicle 201 is going to move to the left or right. Driver 232 can use other components in vehicle components 211 to control the direction (e.g., a steering wheel) and speed (e.g., throttle and brakes) of vehicle 201.

Sensors 202 include camera(s) 203 and LIDAR sensor(s) 204. Sensors 202 may also include other types of sensors (not shown), such as, for example, radar sensors, acoustic sensors, ultrasonic sensors, electromagnetic sensors, etc. In general, sensors 202 can sense and/or monitor objects around vehicle 201. Sensors 202 can output sensor data indicating the position and optical flow of monitored objects.

Configuration detector 208 is configured to determine a configuration of vehicle 201 from sensor data. A configuration can include the speed of vehicle 201, the acceleration (or the deceleration) or vehicle 201, and the lane where vehicle 201 is traveling.

Lane change assist system 221 includes lane recommendation module 222 and location determination module 223. Lane recommendation module 222 is configured to recommend a lane for vehicle 201 based on the configuration of vehicle 201 and the speed and acceleration (or deceleration) of other vehicles traveling on multi-lane roadway 200 within a specified distance of vehicle 201. Lane recommendation module 222 can output an indication of a recommended lane to projection system 209. Location determination module 223 is configured to identify a location within a recommended lane where vehicle 201 can safely move from a current lane into the recommended lane (e.g., a sufficiently sized interval/gap between other vehicles traveling in the recommended lane). Lane determination module 223 can output an indication of an identified location to projection system 209.

In general, projection system 209 can receive image data (e.g., image data 266) of a roadway environment around vehicle 201 from camera(s) 203. From the image data, projection system 209 can render a visual display (e.g., a HUD) on windshield 244. Projection system 209 can augment elements in the image data, for example, lane markings, other vehicles, merge locations, etc., with additional data. For example, projection system 209 can highlight lane markings or vehicles, indicate vehicle speeds, highlight merge locations, etc. within the visual display. Alternatively, projection system 209 can render an augmented visual display on a display device in the cabin of vehicle 201.

Communication module 207 can include hardware components (e.g., a wireless modem or wireless network card) and/or software components (e.g., a protocol stack) for wireless communication with other vehicles and/or computer systems. Communication module 207 can be used to facilitate vehicle to vehicle (V2V) communication as well as vehicle to infrastructure (V2I) communication. Vehicles 281 and 291 (as well as any other vehicles on multi-lane roadway 200) can include a similarly configured communication module. Thus, vehicles on multi-lane roadway 200 can exchange information with one another using V2V communication.

Each of vehicles 281 and 291 (as well as any other vehicles on multi-lane roadway 200) can also include components that provide at least a subset, and possibly all, of the functionality provided by sensors 202, configuration detector 208, projection system 209, vehicle components 211, lane change assist system 221, and windshield 244.

Figure 3:
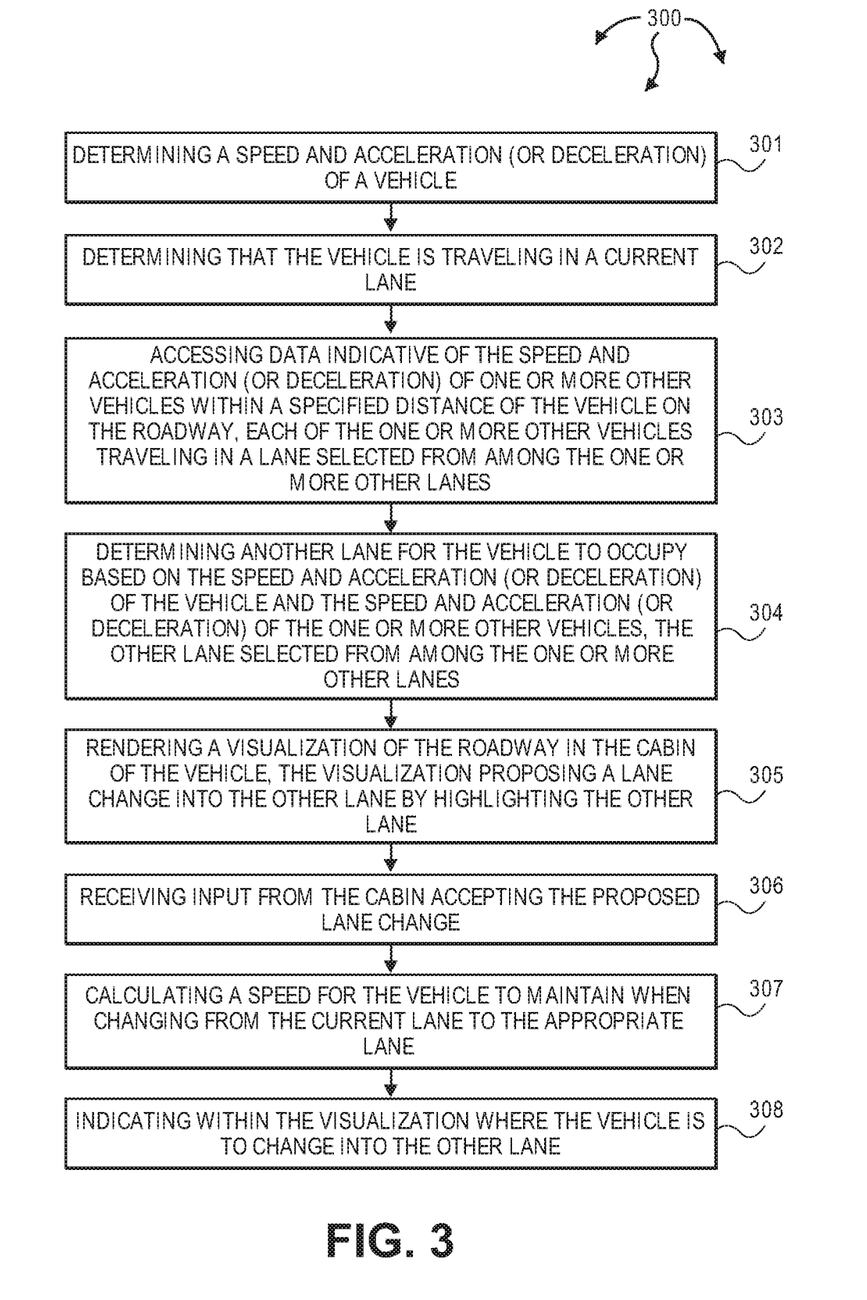
FIG. 3 illustrates a flow chart of an example method for assisting a driver with roadway lane change.

FIG. 3 illustrates a flow chart of an example method for assisting a driver with a roadway lane change. Method 300 will be described with respect to the components and data of computer architecture 200.

Method 300 includes determining a speed and acceleration (or deceleration) of a vehicle (301). Method 300 incudes determining that the vehicle is traveling in a current lane (302). For example, sensors 202 can sense sensor data 229 from the environment around vehicle 201. From sensor data 229, configuration detector 208 can detect that vehicle 201 is in vehicle configuration 224. Vehicle configuration 224 includes speed 226, acceleration 227, and lane indication 228. Speed 226 can indicate a current speed of vehicle 201 (e.g., miles per hour, "mph"), acceleration 227 can indicate change in speed 226 (e.g., is speed 226 increasing or decreasing), and lane indication 228 can indicate that vehicle 201 is in lane 262.

Sensor data 229 can also indicate the location of other vehicles on multi-lane roadway within a specified distance (e.g., within ¼ mi) of vehicle 201. For example, sensor data 229 can indicate the location of vehicle 281 in lane 261 and the location of vehicle 291 in lane 263. Sensor data 229 can be sensed and sent to configuration detector 208 and lane change assist system 221 on an on-going basis as vehicle 201 travels down multi-lane roadway 200.

Method 300 includes accessing data indicative of the speed and acceleration (or deceleration) of one or more other vehicles within a specified distance of the vehicle on the roadway, each of the one or more other vehicles traveling in a lane selected from among the one or more other lanes (303). For example, communication module 207 can receive motion data 282 from vehicle 281. Motion data 282 includes speed 283 and acceleration 284. Speed 283 can indicate a current speed of vehicle 281 (e.g., mph) and acceleration 284 can indicate change in speed 283 (e.g., is speed 283 increasing or decreasing). Similarly, communication module 207 can receive motion data 292 from vehicle 291. Motion data 292 includes speed 293 and acceleration 294. Speed 293 can indicate a current speed of vehicle 291 (e.g., mph)

and acceleration 294 can indicate change in speed 293 (e.g., is speed 293 increasing or decreasing). Communication module 207 can also receive data indicative of speed and acceleration (or deceleration) from any other vehicles on multi-lane roadway within the specified distance of vehicle 201.

Method 300 includes determining another lane for the vehicle to occupy based on the speed and acceleration (or deceleration) of the vehicle and the speed and acceleration (or deceleration) of the one or more other vehicles, the other lane selected from among the one or more other lanes (304). For example, lane recommendation module 222 can determine that it is more efficient for vehicle 201 to occupy lane 261 based on vehicle configuration 224, motion data 282, and motion data 292 (as well as motion data from any other vehicles). Lane recommendation module 222 can derive lane recommendation 238 indicating more efficient travel is possible in lane 261. Lane recommendation module 222 can send lane recommendation 238 to projections system 209. Projection system 209 can receive lane recommendation 238 from lane recommendation module 222.

Method 300 includes rendering a visualization of the roadway in the cabin of the vehicle, the visualization proposing a lane change into the other lane by highlighting the other lane (305). For example, camera(s) 203 can capture image data 266 of multi-lane roadway 200. Image data 266 can be sent to projection system 209. Image data 266 can be received at projection system 209. Image data 266 can be captured and sent to projection system 209 on an on-going basis as vehicle 201 travels down multi-lane roadway 200.

Projection system 209 can formulate HUD 236 of multi-lane roadway 200 from image data 266 and lane recommendation 238. Projection system 209 can render HUD 236 on windshield 244 (or on another display device in the cabin of vehicle 201). Projection system 209 can augment image data 266 by highlighting lane 261 (e.g., using ambient lighting, coating, sparkling, etc.) within HUD 236 to propose a lane change from lane 262 into lane 261. Driver 232 can perceive HUD 236 on windshield 244 (or other display device). In one aspect, HUD 236 is rendered within field of view 233 of driver 232. As such, driver 232 can maintain a view of multi-lane roadway 200 in direction 206 while also viewing HUD 236.

Method 300 includes receiving input from the cabin accepting the proposed lane change (306). For example, in response to perceiving HUD 236, driver 232 can desire to change vehicle 201 into lane 261. Driver 236 can activate turn signal 241 to indicate acceptance of the recommendation to change from lane 262 into lane 261. In response to activation of turn signal 241, external lights on vehicle 201 can blink in the direction of lane 261. Signal 234 can also be sent to lane change assist system 221. Lane change assist system 221 can receive signal 234 from turn signal 241. Lane change assist system 221 perceives signal 234 as an acceptance of lane recommendation 238.

Method 300 includes calculating a speed for the vehicle to maintain when changing from the current lane to the appropriate lane (307). For example, lane change assist system 221 can calculate a speed for vehicle 201 to maintain when changing from lane 262 to lane 261 based on motion data 282 and motion data 292 (as well as motion data from any other vehicles on multi-lane roadway 200). Maintaining the calculated speed permits vehicle 201 to safely change from lane 262 to lane 261 in view of the speed and acceleration (or declaration) of surrounding vehicles on multi-lane roadway 200.

Method 300 includes indicating within the visualization where the vehicle is to change into the other lane (308). For example, location determination module 223 can determine that it is safe for vehicle 201 to change from lane 262 to lane 261 at location 268. Location determination module 223 can derive lane change indication 239 to indicate location 268. Location determination module 223 can send lane change indication 239 to projection system 209. Projection system 209 can receive lane change indication 239 from location determination module 223.

Projection system 209 can formulate HUD update 237 from image data 266 and lane change location 239. Projection system 209 can augment image data 266 by highlighting location 268 (e.g., using ambient lighting, coating, sparkling, etc.) and indicating the speed of vehicle 281 and vehicle 291 (and any other vehicles in lane 261 within the specified stance of vehicle 201) within HUD update 237. For example, a number can be rendered above vehicle 281 to indicate the speed of vehicle 281 in mph. Similarly, a number can be rendered above vehicle 291 to indicate the speed of vehicle 291 in mph.

Projection system 209 can render HUD update 237 on windshield 244 (or on another display device in the cabin of vehicle 201). Driver 232 can perceive HUD update 237 on windshield 244 (or other display device). In one aspect, HUD update 237 is rendered within field of view 233 of driver 232. As such, driver 232 can maintain a view of multi-lane roadway 200 in direction 206 while viewing HUD update 237.

Driver 232 can then utilize vehicle components 211, for example, steering wheel, throttle, etc., to implement lane change 267 in lane 261 at location 268.

In one aspect, lane recommendations are provided at vehicle 201 in essentially real-time as vehicle 201 travels down multi-lane roadway 200. As vehicle 201 travels, lane recommendations can change as the traffic environment within the specified distance of vehicle 201 changes. As recommendations are presented, driver 232 can choose to act on a lane change recommendation or ignore the lane change recommendation.

In some aspects, lane recommendations and lane change locations can also be indicated to driver 232 using audio output. As lane recommendation module 223 recommends lanes, lane recommendations can also be sent to an audio system. Similarly, as location determination module determines lane change locations, lane change locations can be sent to the audio system. The audio system can output an audio cue (e.g., through one or more speakers) in the cabin of vehicle 201. The audio cue can alert driver 232 to view HUD 236, view HUD update 237, etc.

Figure 4A:
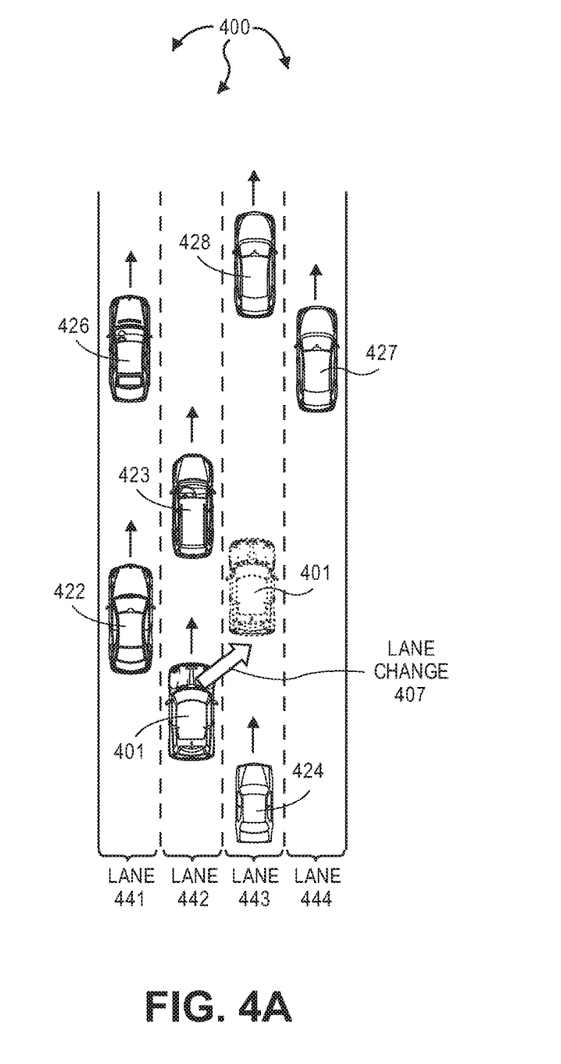
FIG. 4A illustrates an example of vehicles on a multi-lane roadway.

FIG. 4A illustrates an example of vehicles traveling in different lanes of multi-lane road 400. Turning to FIG. 4A, vehicles 422 and 426 are in lane 441. Vehicles 401 and 423 are in lane 442. Vehicles 424 and 428 are in lane 443. Vehicle 427 is in lane 444. As indicated by the arrows, all of the cars depicted in FIG. 4A are generally traveling in the same direction. Vehicle 401 can be traveling faster than vehicle 423. As vehicle 401 approaches vehicle 423 from behind, a lane change assist system in vehicle 401 can determine and recommend a more efficient lane of travel for vehicle 401.

Figure 4B:
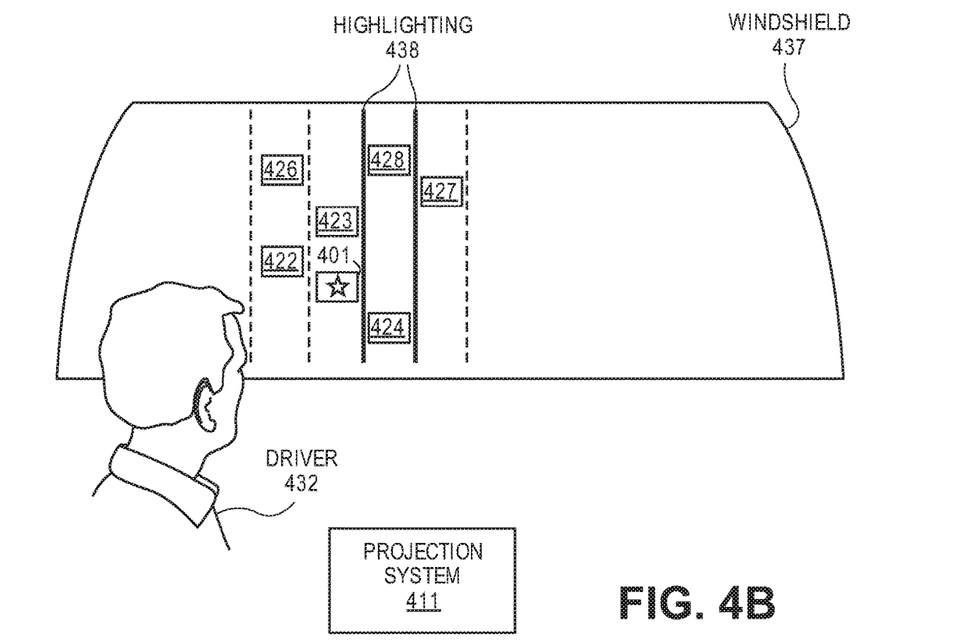
FIG. 4B illustrates an example real-time display augmented to indicate a recommended lane.

Turning to FIG. 4B, projection system 411 can present a real-time display of multi-lane roadway 400 on windshield 437. The lane recommendation system can recommend lane 443 as a more efficient lane of travel for vehicle 401. Projection system 411 can augment the real-time display with highlights 438 to identify lane 443 as a recommend lane. Vehicle 401 (the vehicle driver 432 is driving), can be identified using a different icon, such as, a star. Driver 432 can view the real-time display and desire to change from lane 442 to lane 443. Driver 432 can activate a right turn signal in vehicle 401 to indicate the desire to change into lane 443.

Figure 4C:
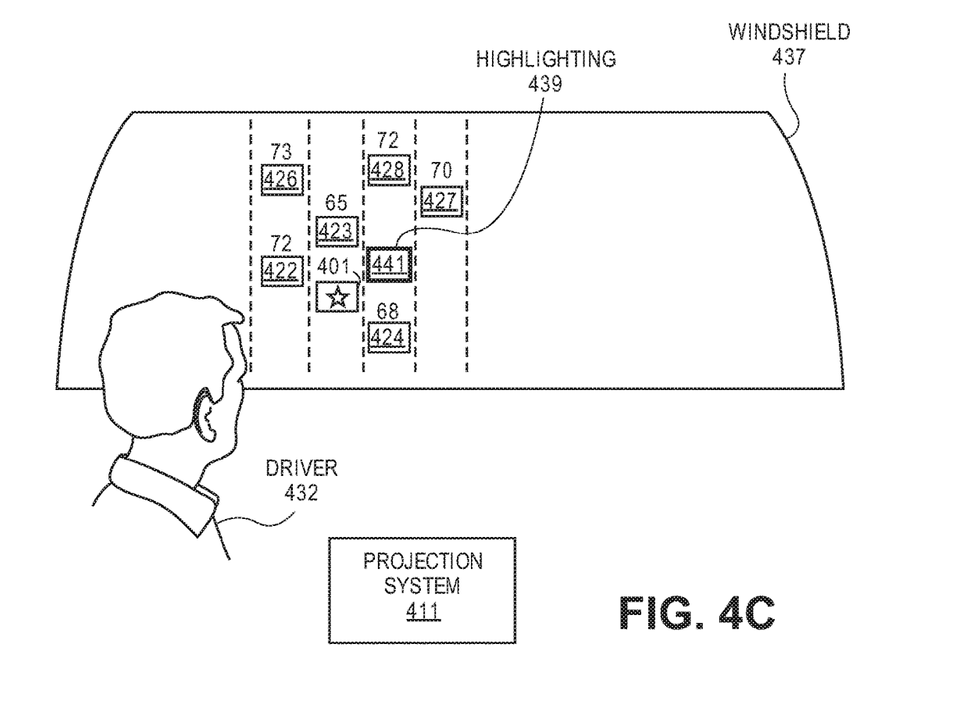
FIG. 4C illustrates the example real-time display augmented to indicate a lane change location and vehicle speeds.

Turning to FIG. 4C, the lane changes assist system can identify location 441 where a lane change from lane 442 to lane 443 can safely occur. Projection system 411 can augment the real-time display with highlights 439 to indicate location 441. Projection system 411 can also augment the real-time display with the speed of other vehicles on multi-lane road 400 (e.g., in mph). Returning briefly to FIG. 4A, driver 432 can then implement lane change 407 to move vehicle 401 from lane 442 to lane 443.

Figure 5:
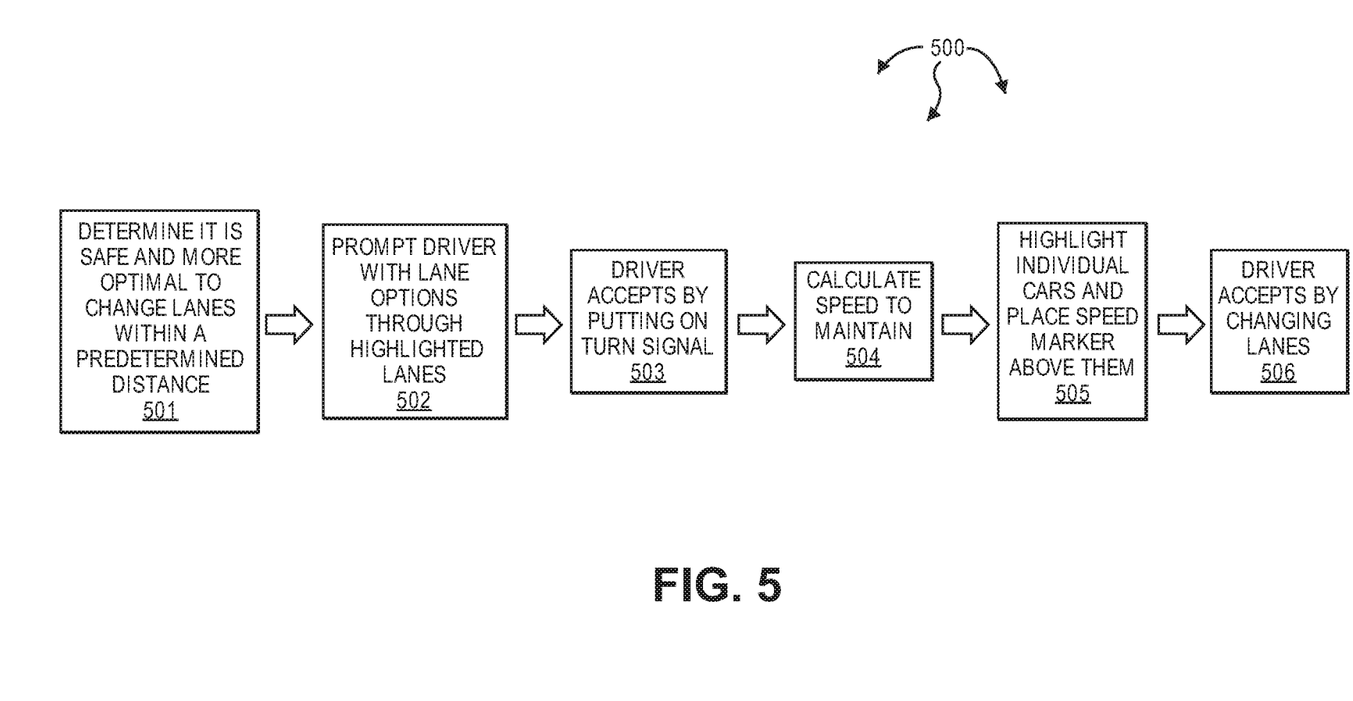
FIG. 5 illustrates a data flow of an example method for assisting drivers with roadway lane changes.

FIG. 5 illustrates a data flow 500 of an example method for assisting drivers with roadway lane changes. At 501, a lane change assist system can determine it is safe and more optimal to for a vehicle to change lanes with in a predetermined distance. At 502, the lane change assist system can prompt a driver with lane options through highlighted lanes on a display. At 503, the driver can accept one of the lanes by putting on a turn signal (e.g., left or right). At 504, the lane change assist system can calculate a speed for the vehicle to maintain. At 505, the lane change assist system can highlight individual cars and place speed markers above them on the display. At 506, the driver can accept a lane option by changing lanes.

Accordingly, aspects of the invention assist a driver with safely changing between lanes on a multi-lane roadway in a variety of different scenarios.

In one scenario, freeway traffic impedes a normal commute. A vehicle may be in a middle lane and a lane change assist system determines that there are open lanes available to optimize the commute. The lane change assist system provides two lane opens, a lane to the right and a lane to the left. The two lanes are highlighted using an Augmented Reality (AR) visualization.

A driver selects the left lane by activating the left turn signal. Activation of the turn signal, sends a message to the lane change assist system. The lane change assist system performs a series of calculations taking into consideration speed of the vehicle and speeds of surrounding vehicles. The lane change assist system identifies a car to merge in front of and a car to fit behind. The cars are highlighted using an AR system visualization and a number appears above them indicating their speed. The AR system can also indicate a speed for the vehicle to maintain in order to merge safely and successfully. The driver can then move the vehicle into the left lane. Alternately, driver can choose not to move into the left lane. The driver can cancel the merge by remaining in the current lane or moving the turn signal back to center.

In another scenario, a faster vehicle is impeded by another slower vehicle on a freeway. The slower vehicle is slower due to the driver being unfamiliar with the area and unsure of which exit to take. In this scenario, a lane change assist system determines it is better to switch to another lane rather than waiting for the vehicle in the front to pick up speed. The driver of the faster vehicle is a novice driver and under normal circumstances would rather maintain status quo. However, the lane change assist system can provide the novice driver an additional level of comfort when switching to a more optimal lane.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, sensor data, vehicle configuration, motion data, speed, acceleration (or deceleration), lane change recommendations, lane change locations, HUDs, HUD updates, vehicle component activation signals, lane locations, AR data, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, sensor data, vehicle configuration, motion data, speed, acceleration (or deceleration), lane change recommendations, lane change locations, HUDs, HUD updates, vehicle component activation signals, lane locations, AR data, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed:

1. A method for assisting with a roadway lane change from a current lane, the method comprising:
    determining a vehicle can travel more efficiently in other lanes based on speed and acceleration of other vehicles on the roadway;
    presenting a real-time windshield display of the roadway on a vehicle windshield that depicts a roadway configuration, the vehicle, and the other vehicles;
    receiving driver input indicating a desire to switch to another lane;
    calculating a speed for the vehicle to maintain;
    indicating on the real-time windshield display when it is appropriate for the vehicle to change into the other lane.

2. The method of claim 1, wherein determining a vehicle can travel more efficiently in other lanes comprises determining that traffic is moving faster in the other lanes.

3. The method of claim 1, wherein determining a vehicle can travel more efficiently in other lanes comprises:
    determining a speed and acceleration of the vehicle;
    determining that the vehicle is traveling in the current lane;
    accessing data indicative of the speed and acceleration of one or more other vehicles within a specified distance of the vehicle on the roadway, each of the one or more other vehicles traveling in a lane selected from one or more other lanes of the roadway; and
    determining it is appropriate for the vehicle to move into the other lane based on the speed and acceleration of the vehicle and the speed and acceleration of the one or more other vehicles.

4. The method of claim 1, further comprising:
    for each of the other vehicles, augmenting the real-time windshield display to indicate a speed of travel for the other vehicle within the real-time windshield display; and
    highlight the other lanes in the real-time windshield.

5. The method of claim 1, wherein receiving driver input indicating a desire to switch to another lane comprises detecting activation of a turn signal at the vehicle.

6. The method of claim 1, wherein calculating a speed for the vehicle to maintain comprises calculating a speed for the vehicle to safely move into the other lane based on the speed and acceleration of other vehicles within a specified distance of the vehicle on the roadway.

7. The method of claim 1, further comprising:
determining the speed and acceleration of the vehicle using LIDAR; and
receiving speed and acceleration data for one or more other vehicles on the roadway through vehicle-to-vehicle (V2V) communication.

8. The method of claim 1, further comprising:
using Augmented Reality (AR) to highlight the speed of one or more vehicles in the other lane within the real-time windshield display; and
wherein indicating when it is appropriate for the vehicle to change into the other lane between other vehicles comprises using Augmented Reality (AR) to highlight the other vehicles in a visual format within the real-time windshield display.

9. The method of claim 1, further comprising determining that the vehicle is in a lane of a multi-lane roadway;
wherein determining a vehicle can travel more efficiently in other lanes comprises determining that the vehicle can travel more efficiently in one or more other lanes of the multi-lane roadway;
wherein receiving driver input indicating a desire to switch to another lane comprises receiving a driver selection of another lane from among the one or more lanes of the multi-lane roadway, the other lane adjacent to the lane on the multi-lane roadway; and
wherein indicating when it is appropriate for the vehicle to change into the other lane between other vehicles comprises indicating when it is appropriate for the vehicle to change into the other lane of the multi-lane roadway on the real-time windshield display.

10. The method of claim 1, wherein the vehicle is a motorcycle.

11. A vehicle, the vehicle comprising:
one or more processors;
system memory coupled to one or more processors, the system memory storing instructions that are executable by the one or more processors;
the one or more processors executing the instructions stored in the system memory to perform the following:
determine a speed and acceleration of the vehicle;
determine that the vehicle is traveling in the current lane of travel;
access data indicative of the speed and acceleration of one or more other vehicles within a specified distance of the vehicle on the roadway, each of the one or more other vehicles traveling in a lane selected from among the one or more other lanes;
determine another lane for the vehicle to occupy based on the speed and acceleration of the vehicle and the speed and acceleration of the one or more other vehicles, the other lane selected from among the one or more other lanes;
present a real-time windshield display of the roadway on a vehicle windshield that depicts a roadway configuration, the vehicle, and the other vehicles and proposes a lane change to the other lane by highlighting the other lane within the real-time windshield display;
receive input from the cabin accepting the proposed lane change;
calculate a speed for the vehicle to maintain when changing from the current lane to the appropriate lane; and
indicate within the real-time windshield display where the vehicle is to change into the other lane between other depicted vehicles.

12. The vehicle of claim 11, wherein the one or more processors executing the instructions stored in the system memory to determine a speed and acceleration of the vehicle comprises the one or more processors executing the instructions stored in the system memory to use LIDAR to determine the acceleration of the vehicle.

13. The vehicle of claim 11, wherein the one or more processors executing the instructions stored in the system memory to access data indicative of the speed and acceleration of one or more other vehicles comprises the one or more processors executing the instructions stored in the system memory to receive data indicative of the speed and acceleration of one or more other vehicles through vehicle-to-vehicle (V2V) communication.

14. The vehicle of claim 11, wherein the one or more processors executing the instructions stored in the system memory to present a real-time windshield display comprises the one or more processors executing the instructions stored in the system memory to augment presentation of the other vehicles with corresponding numerically indicated speeds of travel within the real-time windshield display.

15. The vehicle of claim 11, wherein the one or more processors executing the instructions stored in the system memory to receive input from the cabin comprises the one or more processors executing the instructions stored in the system memory to detect activation of a turn signal in the direction of the other lane.

16. The vehicle of claim 11, wherein the one or more processors executing the instructions stored in the system memory to present a real-time windshield display comprises the one or more processors executing the instructions stored in the system memory to render the vehicle within the real-time windshield display using a different icon than icons used to render the other vehicles within the real-time windshield.

17. The vehicle of claim 16, wherein the one or more processors executing the instructions stored in the system memory to present a real-time windshield display comprises the one or more processors executing the instructions stored in the system memory to render at least one of: a first vehicle that the vehicle is to go behind when changing from the current lane to the other lane or a second vehicle that the vehicle is to go in front of when changing from the current lane to the other lane within the real-time windshield display.

18. At a vehicle, a method comprising:
determining a speed and acceleration of the vehicle;
determining that the vehicle is traveling in the current lane;
accessing data indicative of the speed and acceleration of one or more other vehicles within a specified distance of the vehicle on the roadway, each of the one or more other vehicles traveling in a lane selected from among the one or more other lanes;
determining another lane for the vehicle to occupy based on the speed and acceleration of the vehicle and the speed and acceleration of the one or more other vehicles, the other lane selected from among the one or more other lanes;
projecting a Heads Up Display (HUD) of the roadway on a vehicle windshield that depicts a roadway configuration, the vehicle, and the other vehicles and proposes a lane change to the other lane by highlighting the other lane within the real-time windshield display;

receiving input from the cabin accepting the proposed lane change;

calculating a speed for the vehicle to maintain when changing from the current lane to the appropriate lane; and indicating within the Heads Up Display (HUD) where the vehicle is to change into the other lane.

19. The method of claim 18, wherein the vehicle is a human operated vehicle.

20. The method of claim 18, wherein indicating within the Heads Up Display (HUD) when the vehicle is to change into the other lane comprises indicating a targeted space within the Heads Up Display (HUD) before or after at least one other vehicle in the other lane as an opportunity for the lane change.

* * * * *